(12) United States Patent
Zhao et al.

(10) Patent No.: US 11,673,173 B2
(45) Date of Patent: Jun. 13, 2023

(54) SPECIAL ROLLER MACHINE FOR METAL POLAR PLATE

(71) Applicant: Taiyuan University of Science and Technology, Shanxi (CN)

(72) Inventors: Fuqiang Zhao, Shanxi (CN); Hugang Tian, Shanxi (CN); Qingxue Huang, Shanxi (CN); Lun Zhao, Shanxi (CN); Hongquan Dong, Shanxi (CN); Xiaodong Zhang, Shanxi (CN)

(73) Assignee: Taiyuan University of Science and Technology, Taiyuan (CN)

( * ) Notice: Subject to any disclaimer, the term of this patent is extended or adjusted under 35 U.S.C. 154(b) by 0 days.

(21) Appl. No.: 17/516,908

(22) Filed: Nov. 2, 2021

(65) Prior Publication Data
US 2022/0055084 A1  Feb. 24, 2022

(30) Foreign Application Priority Data

Nov. 6, 2020  (CN) .......................... 202011227947.8

(51) Int. Cl.
*B21B 13/00* (2006.01)
*B21B 13/02* (2006.01)

(52) U.S. Cl.
CPC .................... *B21B 13/02* (2013.01)

(58) Field of Classification Search
CPC ..... B21B 13/02; B21B 13/142; B21B 13/145; B21B 35/12; B21B 35/14; B21B 35/143
See application file for complete search history.

(56) References Cited

U.S. PATENT DOCUMENTS

2018/0243821 A1*  8/2018  Ma .................... B22D 11/064

FOREIGN PATENT DOCUMENTS

| CN | 101347791 A | 1/2009 |
| CN | 206794359 U | 12/2017 |
| CN | 110076201 A | 8/2019 |

* cited by examiner

*Primary Examiner* — Debra M Sullivan (57) ABSTRACT

A special roller machine for a metal polar plate. A box body is a square with a circular through hole in the middle part. Upper and lower pressing rollers are mounted in the circular through hole; the upper and lower pressing rollers are mounted in grooves formed in the lower sides of upper and lower sector rotating bodies through bearing seats and are connected with upper and lower rotating blocks respectively; the rotating blocks are symmetrically arranged and are connected with upper and lower servo electric cylinders through connecting rod mechanisms respectively, then the pressing rollers are finely adjusted; four identical arch-shaped plates are mounted on the inner surface of the circular through hole for locating the rotating blocks; and main transmission is implemented in such a way that a servo motor drives the lower pressing roller to move through a safety coupling, a reduction gearbox and a cross coupling.

1 Claim, 7 Drawing Sheets

SPECIAL ROLLER MACHINE FOR METAL POLAR PLATE

CROSS-REFERENCE TO RELATED APPLICATIONS

This application claims the benefit of priority from Chinese Patent Application No. 202011227947.8, filed on Nov. 6, 2020. The content of the aforementioned application, including any intervening amendments thereto, is incorporated herein by reference in its entirety.

TECHNICAL FIELD

The present invention belongs to the technical field of manufacturing of metal polar plates, and particularly relates to a special roller machine for a metal polar plate.

BACKGROUND OF THE PRESENT INVENTION

At present, an ultrathin metal polar plate has been applied to fuel cells, while the batch processing mode of the ultrathin metal polar plates is still traditional punching processing. Punching processing requires a special clamping die and also requires to clamp a next metal plate again after processing is completed each time, which may increase the production cost and may also cause incapability of continuous production and reduce the production efficiency.

SUMMARY OF THE PRESENT INVENTION

The purpose of the present invention is to provide a special roller machine for a metal polar plate, capable of effectively overcoming the disadvantages in the prior art.

Figure 1:
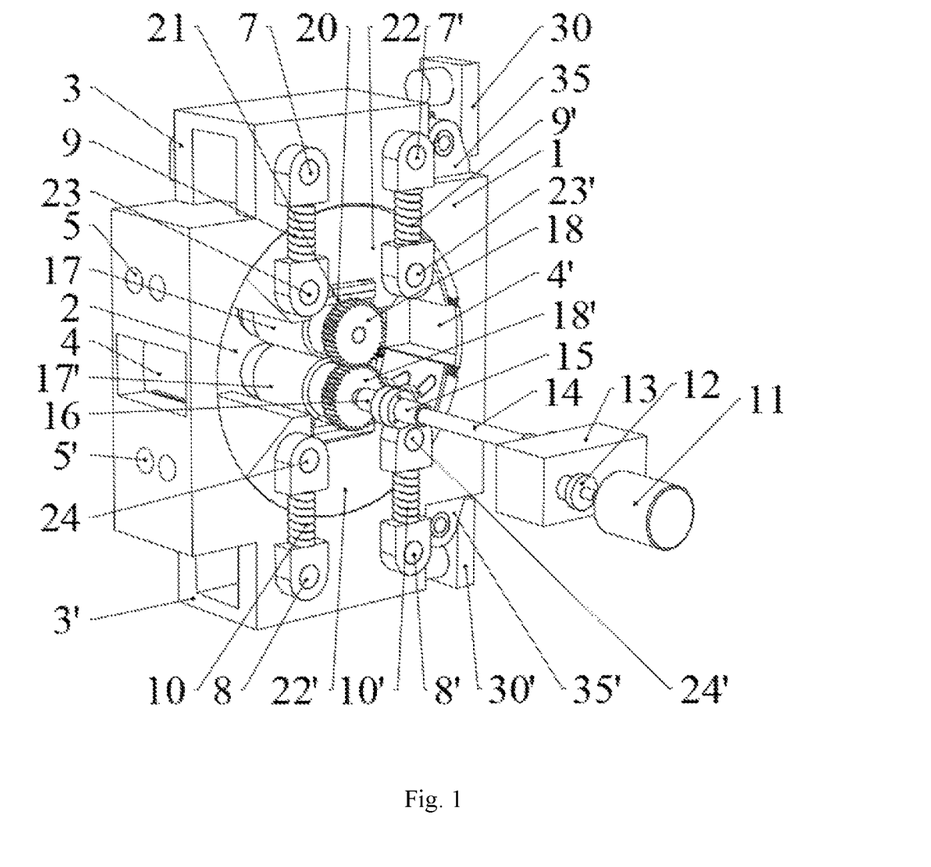
FIG. 1 is a schematic diagram of a final assembly of the present invention.
Figure 2:
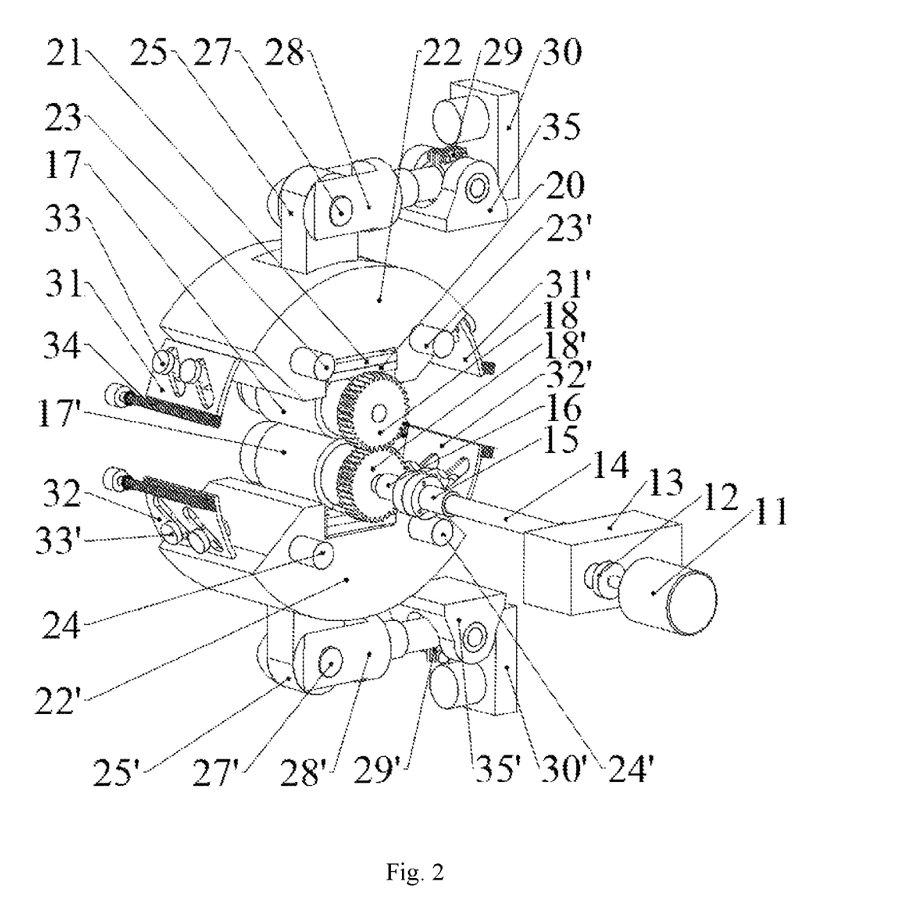
FIG. 2 is a structural diagram of a pressing device in a box body of the present invention.
Figure 3:
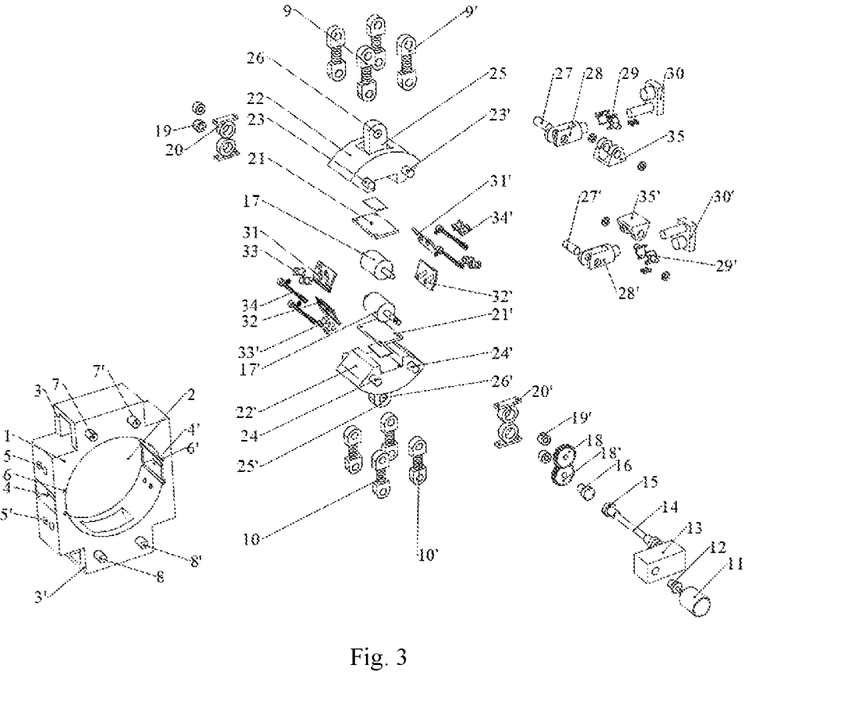
FIG. 3 is an exploded view of the final assembly of the present invention.
Figure 4:
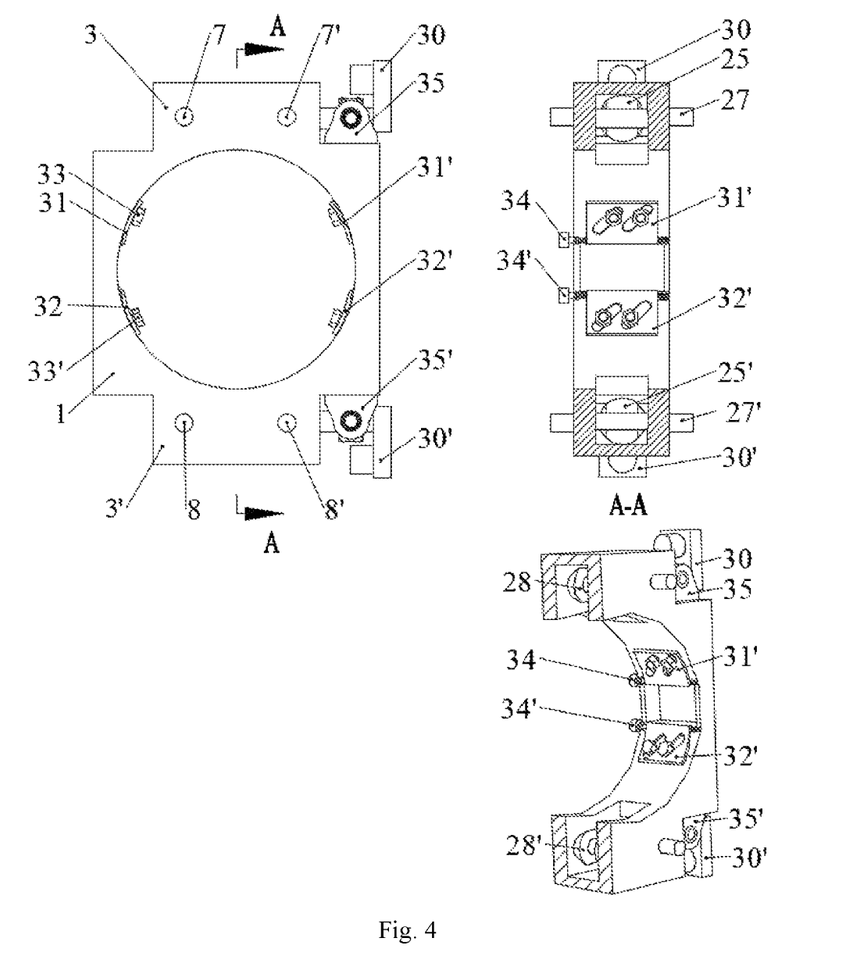
FIG. 4 is a schematic diagram of connection between the box body and an arch-shaped plate of the present invention.
Figure 5:
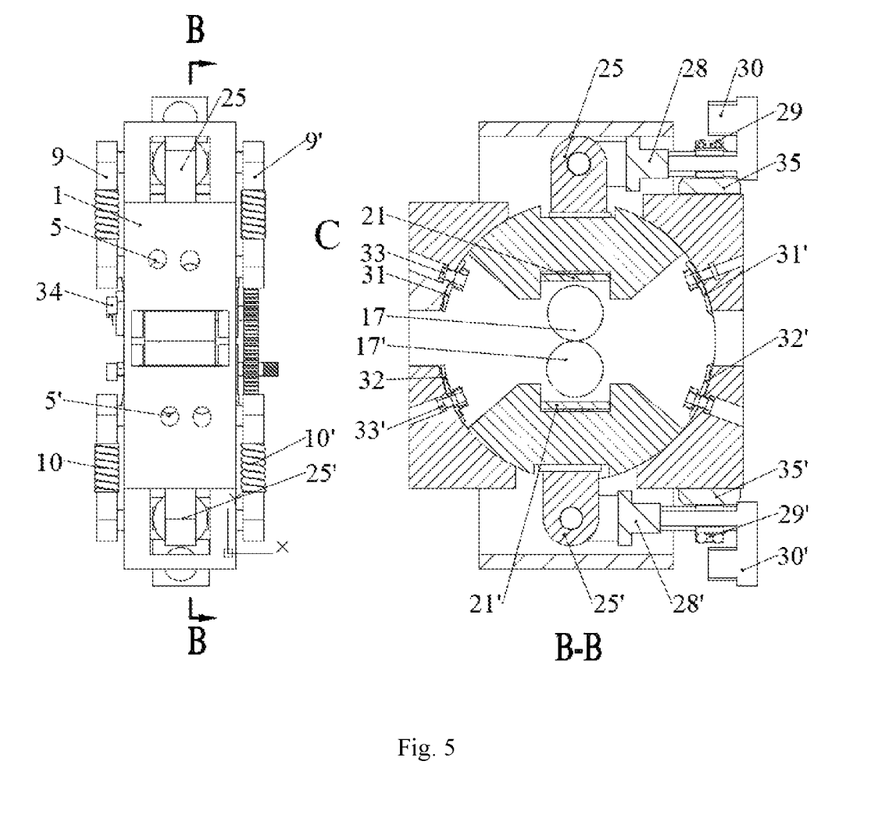
FIG. 5 is a side view and a B-B section view of the present invention.
Figure 6:
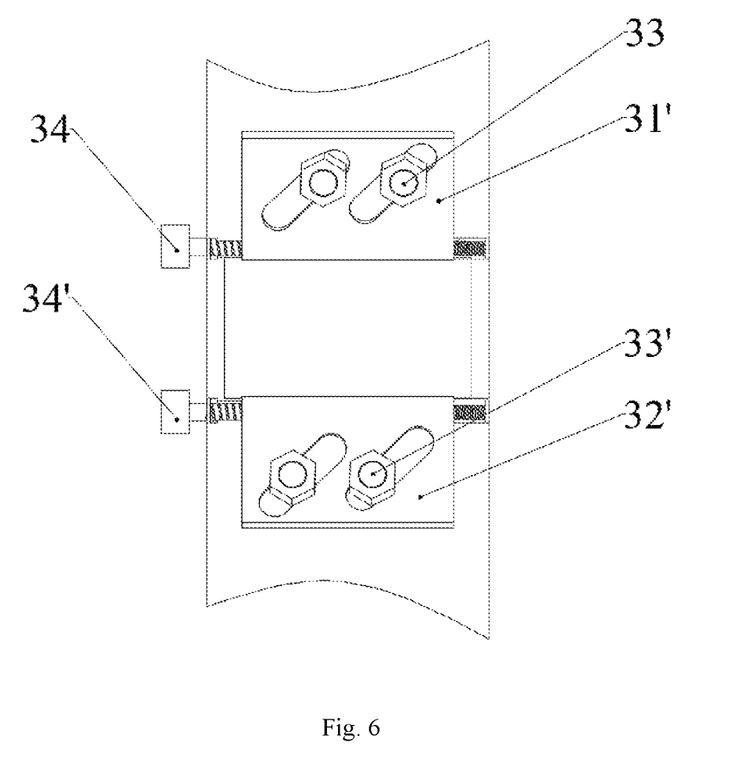
FIG. 6 is an enlarged view of an arch-shaped plate of the present invention.
Figure 7:
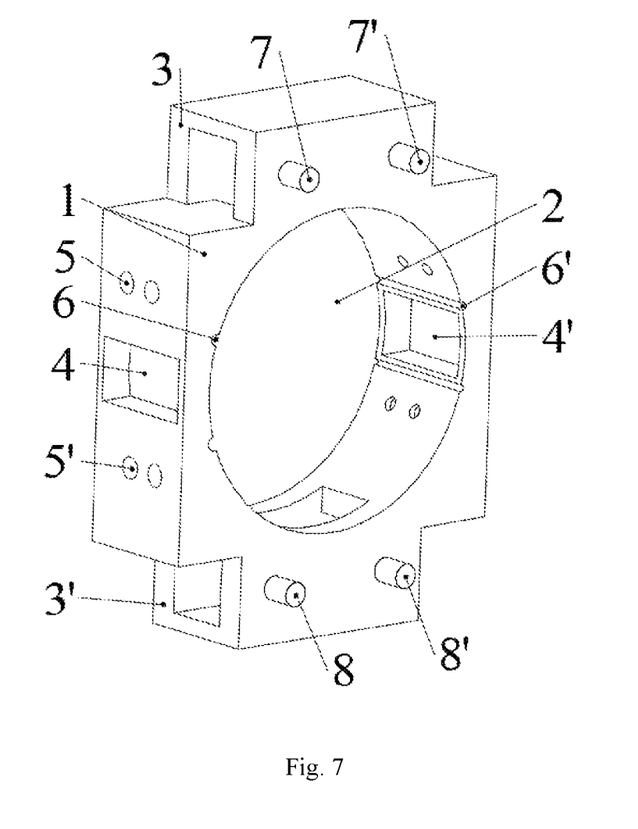
FIG. 7 is a schematic diagram of the box body of the present invention.

The present invention is implemented in such a way that, as shown in FIG. 1, a box body 1 is a square; a circular through hole 2 is processed on the front surface of the box body 1; transversely through upper and lower lug bosses 3, 3' are manufactured at the upper end and the lower end of the box body 1; a feed inlet 4 and a discharge port 4' are formed in the upper and middle parts of the left side surface and the right side surface of the box body 1 respectively; holes 5, 5' for upper and lower fixing screws are formed in the upper part and the lower part of the box body 1 respectively; upper left and right cantilever beam 7, 7' and lower left and right cantilever beam 8, 8' are manufactured on the front surfaces of the upper and lower lug bosses 3, 3' respectively, and the cantilever beams are sleeved with upper left and right spring bodies 9, 9' and lower left and right spring bodies 10, 10' respectively; a main transmission device includes a servo motor 11 connected with a lower synchronous gear 18' at the shaft end of a lower pressing roller 17' through a safety coupling 12, a reduction gearbox 13, a transmission shaft 14, a cross coupling 15 and a spline housing 16; a pressing adjustment structure connected with the main transmission device is wholly mounted in the circular through hole 2 formed in the box body 1; as shown in FIGS. 2 and 3, left and right bearings 19, 19' mounted on left and right shaft necks of the upper and lower pressing rollers 17, 17' are connected and mounted in grooves of upper and lower rotating blocks 22, 22' through corresponding left and right bearing seats 20, 20' and left and right bearing seat fixing plates 21, 21', and pressure sensors are placed at the bottoms of the grooves; and the sector upper and lower rotating blocks 22, 22' are mounted symmetrically at the upper part, the lower part, the left part and the right part of the adjustment structure respectively with the same structure. For convenience of illustration, the upper part is described as an example for structure description: an upper supporting seat ring 25 is manufactured at the arch-shaped top end of the upper rotating block 22; a pin shaft hole 26 is formed in the center of the upper supporting seat ring 25 and is hinged to an upper connecting rod 28 through a pin shaft 27, and the other end of the upper connecting rod 28 is connected with an upper servo electric cylinder 30 supported on an upper rotating sleeve 29; the upper servo electric cylinder 30 is mounted in an upper supporting seat 35 through the upper rotating sleeve 29, and the upper supporting seat is fixedly mounted on a step of the box body 1; upper left and right rotating block supporting beams 23, 23' are manufactured on the front surface of the upper rotating block 22, and round holes formed in the lower ends of the upper left and right spring bodies 9, 9' are sleeved on the upper left and right rotating block supporting beams 23, 23' respectively; upper left and right arch-shaped plates 31, 31' are mounted at the upper left part and the upper right part of the surface of the circular through hole of the box body between the upper and lower rotating blocks 22, 22' through fixing screws 33 respectively; and an upper adjustment bolt 34 used for adjusting the position of the arch-shaped plate is mounted in an upper adjustment bolt hole 6 formed in the box body 1; threads at the top end part of the upper adjustment bolt 34 are engaged with threads on the side of the upper left arch-shaped plate 31; and the bolt is rotated to drive arch-shaped displacement, and the other end part of the bolt is tightened against through the corresponding spring.

The beneficial effects of the present invention are as follows:

The special roller machine for the metal polar plate proposed by the present invention can solve the problems of production cost and production efficiency in the punching forming process and can also solve the problems that the forming accuracy of new rollers is low, the adjustment range is too small, and the forming accuracy requirement of a micro roller cannot be satisfied; and the equipment is low in cost, can conduct batch production, is convenient in mounting and changing a roller and may achieve batch production by only several special models of rollers to produce a series of products.

In the drawings: 1—box body; 2—circular through hole; 3, 3'—upper and lower lug bosses; 4, 4'—feed inlet and discharge port; 5, 5'—upper and lower fixing screw holes; 6, 6'—upper left and right adjustment bolt holes; 7, 7'—upper left and right cantilever beams; 8, 8'—lower left and right cantilever beams; 9, 9'—upper left and right spring bodies; 10, 10'—lower left and right spring bodies; 11—servo motor; 12—safety coupling; 13—reduction gearbox; 14—transmission shaft; 15—cross coupling; 16—spline housing; 17, 17'—upper and lower pressing rollers; 18, 18'—upper and lower synchronous gears; 19—left and right bearings; 20, 20'—left and right bearing seats; 21, 21'—left and right bearing seat fixing plates; 22, 22'—upper and lower rotating blocks; 23, 23'—upper left and right rotating block supporting beams; 24, 24'—lower left and right rotating block supporting beams; 25, 25'—upper and lower supporting seat rings; 26—pin shaft hole; 27—pin shaft; 28, 28'—upper and lower connecting rods; 29, 29'—upper and lower rotating sleeves; 30, 30'—upper and lower servo electric cylinders; 31, 31'—upper left and right arch-shaped plates; 32, 32'—lower left and right arch-shaped plates; 33, 33'—upper and lower fixing screws; 34, 34'—upper and lower adjustment bolts; 35, 35'—upper and lower supporting seats.

DETAILED DESCRIPTION OF THE PRESENT INVENTION

The present invention will be further described below in detail in combination with the accompanying drawings and embodiments.

The present invention is implemented in such a way that, as shown in FIGS. 1 and 2, for main transmission of the present invention, a servo motor 11 drives upper and lower synchronous gears 18, 18' and upper and lower pressing rollers 17, 17' to rotate under the driving of a safety coupling 12, a reduction gearbox 13, a transmission shaft 14 and a spline housing 15 for the rolling and production of a metal polar plate; radial fine adjustment of the upper and lower pressing rollers is implemented in such a way that upper and lower servo electric cylinders 30, 30' drive the upper and lower pressing rollers 17, 17' to conduct slight rotation through upper and lower connecting rods 28, 28' and upper and lower rotating blocks 22, 22' hinged to the upper and lower connecting rods 28, 28', so that radial fine adjustment of the upper and lower pressing rollers is achieved; upper left and right arch-shaped plates 31, 31' and lower left and right arch-shaped plates 32, 32' which are mounted on the inner surface of the circular through hole formed in the front surface of the box body 1 are fixedly connected to the inner surface of the circular through hole formed in the box body through fixing bolts 33; positions of the arch-shaped plates are adjusted through threaded engagement between the adjustment bolts 34 and the arch-shaped plates; the effect of the arch-shaped plates is to limit the rotation of the upper and lower rotating blocks; and upper left and right spring bodies and lower left and right spring bodies exert the effect of supporting the upper and lower rotating blocks.

The above only describes preferred embodiments of the present invention, and the protection scope of the present invention is not limited to the above embodiments. All the technical solutions within the concept of the present invention shall belong to the protection scope of the present invention. It should be noted that for those ordinary skilled in the art, several improvements and modifications without departing from the principle of the present invention shall be regarded as within the protection scope of the present invention.

What we claimed is:

1. A roller machine for a metal polar plate, comprising:
a box body;
a main transmission device;
a pressing adjustment structure;
an upper pressing roller; and
a lower pressing roller;
wherein the box body is a square, and a circular through hole is provided on a front surface of the box body;
an upper lug boss is provided at an upper end of the box body, and a lower lug boss is provided at a lower end of the box body;
a feed inlet is provided in a middle of a left side surface of the box body, and a discharge port is provided in a middle of a right side surface of the box body;
holes for upper and lower fixing screws are provided on an upper part and a lower part of the box body;
an upper left cantilever beam and an upper right cantilever beam are provided on a front surface of the upper lug boss; and a lower left cantilever beam and a lower right cantilever beam are provided on the lower lug boss;
the upper left cantilever beam is inserted into an upper left spring body; the upper right cantilever beam is inserted into an upper right spring body; the lower left cantilever beam is inserted into a lower left spring body; and the lower right cantilever beam is inserted into a lower right spring body;
the main transmission device comprises a servo motor, a safety coupling, a reduction gearbox, a transmission shaft, a cross coupling, a spline housing, and a synchronous gear; and the servo motor is connected to the synchronous gear at a shaft end of the lower pressing roller via the safety coupling, the reduction gearbox, the transmission shaft, the cross coupling and the spline housing;
the pressing adjustment structure comprises a servo electric cylinder, a connecting rod, an upper rotating block and a lower rotating block; and the pressing adjustment structure connected to the main transmission device is mounted in the circular through hole formed in the box body; and the upper rotating block and lower rotating block are sector-shaped;
a left bearing mounted on the upper pressing roller is mounted in a groove of the upper rotating block through a left bearing seat and a left bearing seat fixing plate; and a right bearing mounted on the lower pressing rollers is mounted in a groove of the lower rotating block through a right bearing seat and a right bearing seat fixing plate;
pressure sensors are arranged at the groove of the upper rotating block and the groove of the lower rotating block;
a supporting seat ring is provided at an arch-shaped top end of the upper rotating block; a pin shaft hole is provided in a center of the supporting seat ring and is hinged to a first end of the connecting rod through a pin shaft; a second end of the connecting rod is connected to the servo electric cylinder supported on a rotating sleeve; and the servo electric cylinder is mounted in a supporting seat through the rotating sleeve, and the supporting seat is fixedly mounted on a step of the box body;
a left rotating block supporting beam and a right rotating block supporting beam are provided on a front surface of the upper rotating block; the left rotating block supporting beam is inserted into a round hole provided on a lower end of the upper left spring body; and the right rotating block supporting beam is inserted into a round hole provided on a lower end of the upper right spring body;
a left arch-shaped plate is mounted at a left part of a surface of the circular through hole of the box body between the upper and lower rotating blocks by a left fixing screw; and a right arch-shaped plate is mounted at a right part of the surface of the circular through hole of the box body between the upper and lower rotating blocks by a right fixing screw; and an adjustment bolt used for adjusting a position of the left arch-shaped plate is mounted in an adjustment bolt hole formed in the box body; threads at a first end of the adjustment bolt are engaged with threads on a side of the left arch-shaped plate; and the adjustment bolt is rotatable to drive the left arch-shaped plate to move.

\* \* \* \* \*